(12) United States Patent
Dailey et al.

(10) Patent No.: US 6,228,440 B1
(45) Date of Patent: May 8, 2001

(54) PERISHABLE MEDIA INFORMATION STORAGE MECHANISM AND METHOD OF FABRICATION

(75) Inventors: Conan B. Dailey, Scottsdale; Michael S. Lebby, Apache Junction, both of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/124,174

(22) Filed: Jul. 28, 1998

(51) Int. Cl.$^7$ .................................................. C09K 19/00
(52) U.S. Cl. .......................... 428/1.1; 369/284; 369/288; 428/64.4; 428/64.7; 428/64.8; 428/64.9; 428/913; 430/270.11; 430/270.14; 430/270.18; 430/270.2
(58) Field of Search .............................. 428/1, 64.4, 64.7, 428/64.8, 64.9, 913, 1.1; 430/270.11, 270.14, 270.18, 270.2; 369/284, 288

(56) References Cited

U.S. PATENT DOCUMENTS

| | | | |
|---|---|---|---|
| 5,547,728 | 8/1996 | Cunningham et al. | 428/64.1 |
| 5,695,843 | 12/1997 | Chapman et al. | 428/64.1 |
| 5,734,605 | 3/1998 | Zhu et al. | 365/173 |
| 6,046,968 * | 4/2000 | Abramovitch | 369/47 |

FOREIGN PATENT DOCUMENTS

| | | |
|---|---|---|
| 0353391 | 2/1990 | (EP) . |
| 0549488 | 6/1993 | (EP) . |
| 0833314 | 9/1996 | (EP) . |
| 0837459 | 10/1996 | (EP) . |

* cited by examiner

*Primary Examiner*—Nasser Ahmad
(74) *Attorney, Agent, or Firm*—William E. Koch

(57) ABSTRACT

A perishable media information storage mechanism, including a substrate, a data layer for recording data thereon the information storage mechanism, a reflective layer, and a protective lacquer coating. The data layer includes a material responsive to at least one predetermined data elimination factor and includes one of a decayable dye material, a liquid crystal material, a photosensitive material or a plurality of magnetoresistive memory cells. The data layer is characterized as recording data and eliminating access to data in response to at least one of a predetermined use or time factor. In addition, included is a method for fabricating a perishable media information storage mechanism including the steps of providing a substrate, forming a data layer on a surface of the substrate, forming a reflective layer on an uppermost surface of the data layer, and forming a protective coating on an uppermost surface of the reflective layer.

15 Claims, 1 Drawing Sheet

PERISHABLE MEDIA INFORMATION STORAGE MECHANISM AND METHOD OF FABRICATION

FIELD OF THE INVENTION

The present invention pertains to the field of information storage mechanisms, and more particularly to the elimination of access to information contained on information storage mechanisms and method of fabrication.

BACKGROUND OF THE INVENTION

Information storage mechanisms currently found in today's market include many durable media formats. The most common of these durable medias are compact discs (CDs), digital video discs (DVDs), and magnetic tapes. Durable medias are commonly found in many industries including the movie and music industry, and are often utilized in the dissemination of consumer information. At a basic level, the information contained on existing durable media often lasts an inappropriately long time given the content, sensitivity, or application of the contained information. Forecasts, census data, safety procedures, and the like, all have lifetimes after which the data can no longer be relied upon as current. Unfortunately, the durable media on which it is distributed lasts beyond this useful life allowing careless individuals the opportunity to misuse the outdated information.

In the video rental industry, movies are typically contained on durable media which last beyond the rental period, thus the media must be returned to the store. This is both inconvenient for the consumer and the vendor in keeping track with the media. In the instance of sensitive material that is contained on a durable media, the information must be tracked extensively and explicitly destroyed at a costly price, in that the data will last for an extended period of time.

One of the most common of the durable medias, CD-Rs (recordable compact discs), employs dyes and variants which exhibit widely different tolerances to light exposure in determining the media lifetime. Specifically, cyanine dyes are most commonly used in CD-Rs which are considered to be relatively stable and therefore provide for recordation of data for an extended period of time. In many instances, such as those described above, this extended period of time in which the recordation of information is contained on the durable media presents a problem.

Thus, there is a need for a media in which access to information contained is eliminated or the information actually expires upon the happening of a preset determined occurrence and upon predetermined expiration variables.

Accordingly, it is highly desirable to provide for a new and improved media format in which information contained thereon is deemed perishable in nature upon the happening of a preset determined occurrence.

It is a further purpose of the present invention to provide for a new and improved perishable media format in which access to information contained on the perishable media is eliminated based on predetermined factors.

It is yet a further purpose of the present invention to provide for a new and improved perishable media in which recorded information is destroyed based on a predetermined use factor.

It is still a further purpose of the present invention to provide for a new and improved perishable media in which recorded information is destroyed based on a predetermined time factor.

It is a purpose of the present invention to provide for a new and improved method for fabricating a perishable media in which a material which provides for the elimination of access to information contained thereon the perishable media is provided in addition to standard media fabrication materials and techniques.

SUMMARY OF THE INVENTION

The above problems and others are substantially solved and the above purposes and others are realized in a perishable information storage mechanism, including a substrate, a data layer for recording data thereon the communicative media, including a material responsive to at least one predetermined data elimination factor, a reflective layer, and a protective lacquer coating. In addition, included is a method for fabricating a perishable information storage mechanism including the steps of providing a substrate, forming a data layer on a surface of the substrate, forming a reflective layer on an uppermost surface of the data layer, and forming a protective coating in an uppermost surface of the reflective layer.

BRIEF DESCRIPTION OF THE DRAWINGS

The novel features believed characteristic of the invention are set forth in the claims. The invention itself, however, as well as other features and advantages thereof will be best understood by reference to detailed descriptions which follow, when read in conjunction with the accompanying drawings, wherein:

DETAILED DESCRIPTION OF THE PREFERRED EMBODIMENT

During the course of this description, like numbers are used to identify like elements according to the different figures that illustrate the invention. The present invention is based on utilizing a recordable data layer within a perishable information storage mechanism, such as a CD-R, which in response to predetermined factors and conditions is perishable, thus eliminating access to recorded data. The basic predetermined factor utilized for the elimination of access to the recorded data is based on either time and/or use. As a time factor based example, data recorded on a perishable information storage mechanism having included as a part thereof a perishable data layer, has a predetermined period of time in which the recorded data remains in a readable state. After the expiration of a predetermined period of time, the recorded data perishes, and thus becomes unreadable. This perishing of data is typically based on the use of decayable dyes in the recordable data layer. More specifically, the recordable layer is composed of a dye material that in response to the expiration of a predetermined period of time, decays, thus destroying recorded data contained therein.

In an alternative embodiment, data recorded on a media disc having included as a part thereof a perishable data layer, is readable based on a use factor. When the recorded data on the perishable information storage mechanism is read utilizing a reader such as a CD player, or the like, the data read is automatically erased or access to the data is eliminated. This perishing of data is typically based on the use of a perishable data layer that utilizes decayable dyes, magnetoresistive random access memory (MRAM), liquid crystal materials, or photosensitive materials. During operation, access to that portion of data that has been read in response to either magnetic forces, a bias, or light exerted by the player is eliminated, leaving unread portions in an unaltered state. It should be understood that a combination of both time and use as predetermined factors for the perishing of recorded data is anticipated by this disclosure.

Figure 1:
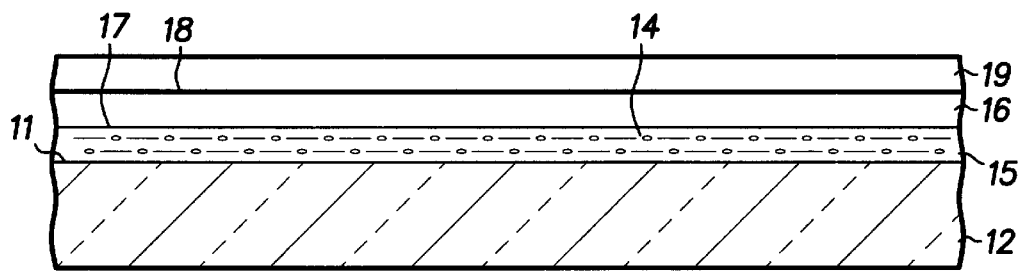
FIG. 1 is a simplified sectional view, illustrating a portion of a perishable information storage mechanism including a dye based data layer responsive to at least one predetermined data access elimination factor, according to the present invention.

Referring now to FIG. 1, illustrated is a sectional view of a first embodiment of a recordable perishable information storage mechanism, according to the present invention. Illustrated is a portion of a recordable media disc, or information storage mechanism, 10. Recordable media disc 10 includes a substrate 12 having an uppermost layer 11. Substrate 12 is generally composed of a clear optical quality polycarbonate transparent material. Substrate 12 is formed through injection molding techniques. Substrate 12 has formed on uppermost surface 11 a data layer 14. In this particular embodiment, data layer 14 is formed of a decayable dye material 15 such Bis(pdimethylaminophenyl) phenyl-4-methylaminomethylium chloride; Methyl Violet; CI Basic Violet 1 (4-NHMe) $C_{24}H_{28}N_3Cl(393.5)$, Bis(4-dimethylaminophenyl) streptopolymethinecyanine (n=2) $C_{21}H_{25}N_2Cl(340.5)$, 4-(4'-Dimethylaminostyryl)-2,6-diphenyltelluropyrylium tetrafluoroborate (n=1; tetrafluoroborate) $C_{27}H_{24}NBF_4Te(576.4)$, Bis (chalcogenopyrylo)methine (n=1; X=S; Y=Se; Z=ClO$_4$) $C_{37}H_{27}O_4ClSSe(681.6)$, other dyes from the polymethine family or basic dyes, or other typically known dyes utilized in the information storage field when fabricated in a thin state, typically less than 100 nm in thickness. Decayable dye material is generally of a high concentration with a range of thickness from 20 nm thick to 100 nm thick, with an optimal thickness of 50 nm thick. Generally, a dye material that includes poor light fastness properties and sufficient light absorptive Properties is sufficient for dye material 15. In an alternative embodiment a dye activant, such as titanium oxide, is utilized that by photocatalytic process provides for the oxidizing the dye material, as well as a plastic resin of which it may be formed as a part of.

Data layer 14 serves to record data when a recording laser (not shown) selectively changes the characteristics of portions of dye layer 15 by simply melting it slightly. This causes these portions of data layer 14 to become translucent so that the reading laser beam (not shown) is reflected back to the reader's sensors rather than absorbed.

Data layer 14 is fabricated from a decayable dye material. Dye material 15 includes inherently weaker chemical bonds which accelerate its destruction, thus the loss of recordable data in response to predetermined factors such as use and/or time. Dye material 15 in an un-melted state absorbable to laser wavelengths used to read data. To represent bits, spots of dye material 15 on disc 10 are melted which enables the light from the reading laser source to reflect back to the detector. When dye material 15 breaks down, due to heat or exposure to light, reflection is prevented, effectively destroying the data recorded on the media disc 10.

During operation of media disc 10 having data recorded thereon, in a first example, dye material 15 is decayable after a predetermined period of time. Therefore, the user of media disc 10 would be unable to read data contained on media disc 10 after a certain period of time. In an alternative mode of operation, dye material 15 is decayable after information is read by a reader, or the like. More specifically, media disc 10 which is typically able to be read by a standard CD reader, is exposed to a specific laser light. This exposure to laser light causes the melting of dye material 15, thereby eliminating the access to the data by actually destroying the data recorded on media disc 10.

Media disc 10, more particularly dye material 15 is fabricated to allow for the melting of dye material 15 only to the extent of the actual data read. Accordingly, the user of media disc 10 would have the ability to stop the reading of data contained on media disc 10 at a random point without the destruction of data unread and remaining on media disc 10. It should be understood that a combination of use and time factors can be combined so as to permit the destruction of data recorded on media disc 10 at a certain predetermined time, i.e. ten days from time of recordation, regardless of whether or not the information has been read.

Media disc 10 has positioned on an uppermost surface 17 of recordable data layer 14, a reflective layer 16.

Reflective layer 16 is composed of a metal material positioned on top of dye material 15. Reflective layer 16 serves to reflect the reading laser beam back to the reading assembly. In a preferred embodiment, reflective layer 16 is formed of a 24K gold material, but the use of silver and aluminum are anticipated by this disclosure.

There is positioned on an uppermost surface 18 of reflective layer 16, a protective layer 19. Protective layer 19 is typically formed of a protective lacquer coating and serves to protect the underlying structure. Protective layer 19 is spincoated in a thin layer on top of reflective layer 16 to protect it from abrasion and corrosion.

Figure 2:
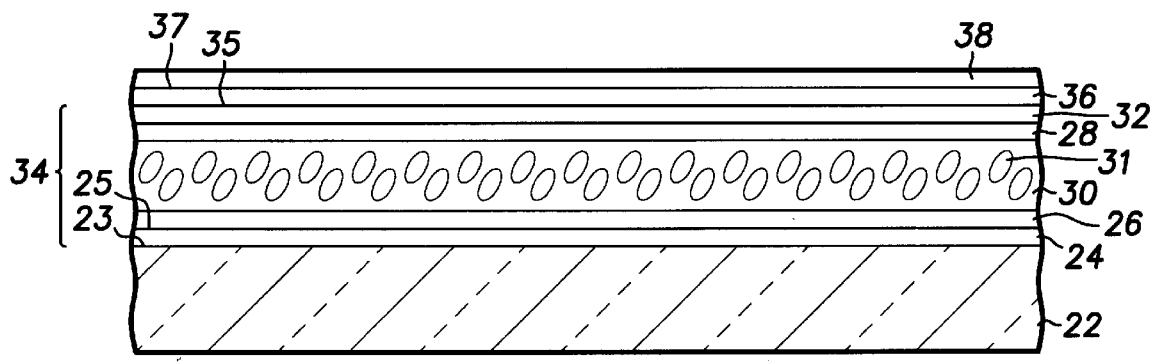
FIG. 2 is a simplified sectional view, illustrating a portion of a perishable information storage mechanism including a liquid crystal based data layer, the liquid crystal material responsive to at least one predetermined data elimination factor, according to the present invention.

Referring now to FIG. 2, illustrated is a second embodiment of a perishable media information storage mechanism, or media disc, 20 including a recordable data layer 34. In this particular embodiment, recordable data layer 34 is formed as a liquid crystal memory cell, including a liquid crystal material. Media disc 20 includes a substrate 22 having an uppermost surface 23. Substrate 22 is generally composed of a clear optical quality polycarbonate transparent material. Substrate 22 is formed through injection molding techniques. Substrate 22 has formed on uppermost surface 23 an electrically conductive material layer 24. Electrically conductive material layer 24 is fabricated of an optically transparent material, such as indium-tin-oxide (ITO), or the like. A molecular liquid crystal alignment, or orientation, layer 26 is positioned on an uppermost surface 25 of electrically conductive material layer 24. Alignment layer 26, in combination with a second alignment layer 28, serves to properly position and align a plurality of molecules 30 comprising the liquid crystal material (discussed presently), so as to orient the molecules in a specific direction according to recorded data. It should be understood that while two separate alignment layers 26 and 28 are disclosed in this embodiment, alternative fabrication utilizing only one single alignment layer is anticipated by this disclosure. A second electrically conductive material layer 32 is provided to complete the circuit to liquid crystal material 31. Accordingly, a recordable data layer, or liquid crystal memory cell, 34 is defined by layers 24, 26, 28, 30, and 32.

During fabrication of media disc 20, steps are completed so as to record varying data information in recordable data layer 34, more particularly in alignment layers 26 and 28, utilizing laser writing techniques. Once this step in the fabrication process is complete, the components are aligned, filled with a continuous layer of liquid crystal material 31 composed of the plurality of liquid crystal molecules 30. Once filled, the recorded information in the alignment layers 26 and 28 serves to align the liquid crystal molecules 30 contained within media disc 20. It should be understood that during fabrication of data recording layer 34, that a drive circuitry (not shown) is interfaced with conductive material layers 24 and 32 thereby capable of biasing recordable data layer 34 and recording information in molecular alignment layers 26 and 28.

During operation, data recorded within recordable data layer 34 is read by a reader. Once data is read, in response to an exerted bias, access to that portion of data contained in recordable data layer 34 is eliminated by erasing the data. The destruction of data is accomplished by biasing portions of alignment layers 26 and 28, thus changing the molecular structure of liquid crystal molecules 30. Fabrication to avoid cross-talk is required so as to eliminate the undesired destruction of data not read. Accordingly, the exertion of a bias on specific portions of recordable data layer 34 as data is read, allow for the realignment of liquid crystal molecules 30, thus the elimination of recorded data.

Media disc 20 has positioned on an uppermost surface 35 of recordable data layer 34, a reflective layer 36. Reflective layer 36 is composed of a metal material positioned on top of conductive material layer 32. Reflective layer 36 serves to reflect the reading laser beam back to the reading assembly. In a preferred embodiment, reflective layer 36 is formed of a 24K gold material, but the use of silver and aluminum are anticipated by this disclosure.

There is positioned on an uppermost surface 37 of reflective layer 36, a protective layer 38. Protective layer 38 is typically formed of a protective lacquer coating and serves to protect the underlying structure. Protective layer 38 is spincoated in a thin layer on top of reflective layer 36 to protect it from abrasion and corrosion.

In an alternative embodiment of a recordable media disc including a liquid crystal material, a software key would provide access to data stored on the disc by "opening up" the liquid crystal material. This software key would allow for the exertion of a bias when information is read, thus changing the liquid crystal material from a transparent state to an opaque state, thus eliminating access to stored data. The liquid crystal material in an un-biased state is transparent to laser wavelengths used to read data. When the liquid crystal material is changed from a transparent state to an opaque state, due to exposure to a bias, reflection is prevented, effectively destroying or eliminating the access to data on the media disc 20.

Figure 3:
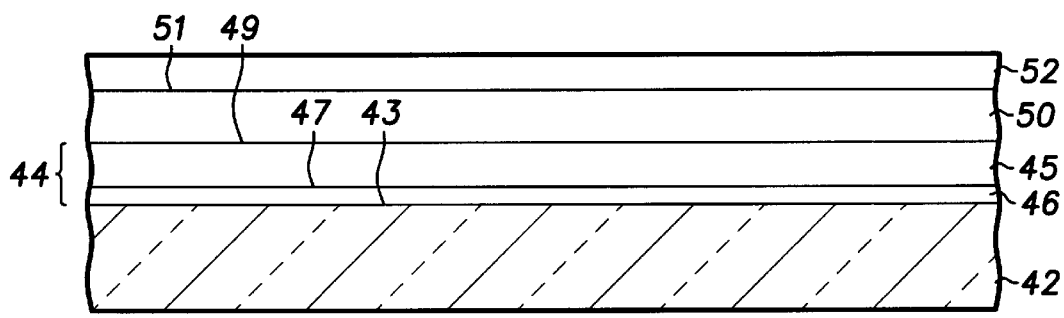
FIG. 3 is a simplified sectional view, illustrating a portion of a perishable information storage mechanism including a photosensitive material based data layer, the photosensitive material responsive to at least one predetermined data elimination factor according to the present invention.

Referring now to FIG. 3, illustrated is a sectional view of a third embodiment of a perishable media information storage mechanism, or recordable media disc according to the present invention. More specifically, illustrated is a portion of a recordable media disc 40. Recordable media disc 40 includes a substrate 42 having an uppermost layer 43. Substrate 42 is generally composed of a clear optical quality polycarbonate transparent material. Substrate 42 is formed through injection molding techniques. Substrate 42 has formed on uppermost surface 43 a data layer 44. In this particular embodiment, data layer, generally referenced as 44, is formed of a photosensitive material 45 such as silver halide, or other similar material characterized as undergoing a change in composition upon the exposure to light and a recording medium 46. Recording medium 46 is disclosed as being formed of an organic dye material, such as cyanine, typically used for the recordation of data therein. As an alternative, data can be formed as part of substrate 42, and is pressed into the uppermost surface 43 of substrate 42 by a "stamper" during the injection molding process. Recording medium 46 serves to record data when a recording laser (not shown) selectively exposes portions of recording medium 46. This causes portions of recording medium 46 to become translucent so that the reading laser beam (not shown) is reflected back to the reader's sensors rather than absorbed. Photosensitive material 45 is formed on an uppermost surface 47 of recording medium 46 and includes light reactive properties that make it reactive to the exposure of light, hence reactive to the reading, or use, when data is read in a reader, such as a CD player, or the like.

In an alternative form, photosensitive material 45 includes an organic growth material that upon a predetermined time factor, "grows" to such an extent that recording medium 46 undergoes denied access. More particularly, recording medium 46 is blocked by an opaqueness of the organic growth material thereby blocking the laser light reading source from reaching recording medium 46.

During operation of media disc 40 having data recorded therein recording medium 46, or stamped thereon a surface 43 of substrate 42, photosensitive material 45 is initially transparent to the wavelength of light utilized by a reader. After information is read by the reading laser, photosensitive material 45 changes from a transparent state to an opaque state, there eliminating access to the recorded information in that reflection is prevented, effectively eliminating access to the data on the media disc 40. Media disc 40, more particularly photosensitive material 45 is fabricated to allow for the exposing to the point of elimination of access of recorded data only to the extent of the actual data read. Accordingly, the user of media disc 40 would have the ability to stop the reading of data contained on media disc 40 at a random point without the destruction of data unread and remaining on media disc 40.

Media disc 40 has positioned on an uppermost surface 49 of data layer 44, a reflective layer 50. Reflective layer 50 is composed of a metal material positioned on top of photosensitive material 45. Reflective layer 50 serves to reflect the reading laser beam back to the reading assembly. In a preferred embodiment, reflective layer 50 is formed of a 24K gold material, but the use of silver is anticipated by this disclosure.

There is positioned on an uppermost surface 51 of reflective layer 50, a protective layer 52. Protective layer 52 is typically formed of a protective lacquer coating and serves to protect the underlying structure. Protective layer 52 is spincoated in a thin layer on top of reflective layer 50 to protect it from abrasion and corrosion.

Figure 4:
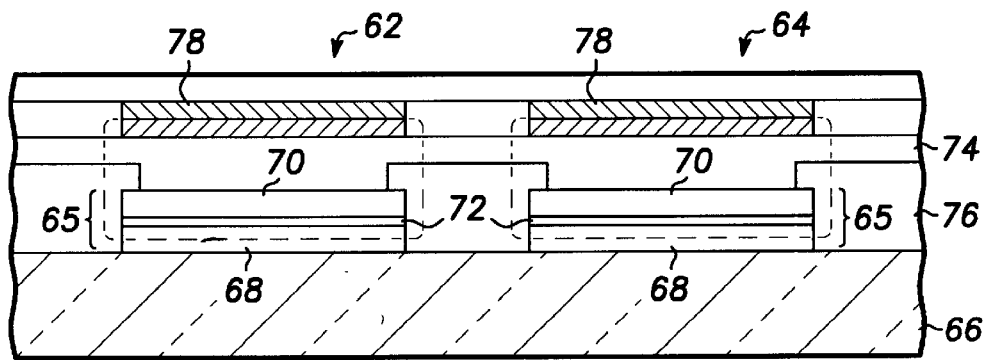
FIG. 4 is a simplified sectional view, illustrating a portion of a perishable information storage mechanism including a magnetoresistive random access memory (MRAM) based data layer, the MRAM responsive to at least one predetermined data elimination factor according to the present invention.

Referring now to FIG. 4, illustrated in simplified sectional view is a fourth embodiment of a perishable media information disc 60 including a plurality of magnetoresistive memory cells 62 and 64, utilizing magnetoresistive random access memory (MRAM) technology. Magnetoresistive memory cells 62 and 64 are fabricated on substrate 66, which in this particular embodiment is formed of a polycarbonate plastic. Magnetoresistive memory cells 62 and 64 each include a magnetic memory cell element 65 in which data is stored in the form of magnetization vectors within the element 65. Typically element 65 is a multi-layer giant magnetoresistive (GMR) material that is well known to those skilled in the art. Magnetic memory cell element 65 are composed of a patterned stripe of two magnetic layers 68 and 70, typically formed of a NiFeCo material. Layers 68 and 70 are separated by a nonmagnetic interlayer 72, typically formed of a Cu material. A dielectric material 74 covers elements 65 and a conductive material layer 76 in order to insulate elements 65 from word line conductors 78. Further information regarding the fabrication of a memory cell utilizing MRAM technology can be found in U.S. Pat. No. 5,734,605, entitled "MULTI-LAYER MAGNETIC TUNNELING JUNCTION MEMORY CELLS", assigned to the same assignee, and incorporated by this reference.

During use, data is recorded in memory cells 65 utilizing magnetic fields. Data is read by a reader that has incorporated the ability to exert magnetic fields sufficient to eliminate access to information recorded within memory cells 65 by erasing the data. This exertion of magnetic fields provides for the elimination of data, thus the disabling of access or use of information due to the predetermined use factor. More specifically, once information is accessed or read, this use produces the magnetic field that destroys the recorded data.

Thus, a new and improved perishable media information storage mechanism is disclosed. The media is intended for use when information sought to be recorded is not intended to last an extended period of time such as that found with durable medias. The elimination of access to the recorded information is controlled by predetermined time and/or use factors and specific materials included within a data layer.

While we have shown and described specific embodiments of the present invention, further modifications and improvement will occur to those skilled in the art. We desire it to be understood, therefore, that this invention is not limited to the particular forms shown and we intend in the appended claims to cover all modifications that do not depart from the spirit and scope of this invention.

What is claimed is:

1. A perishable media information storage mechanism comprising:

a substrate formed of an optical quality material;

a data layer for recording data thereon the media information storage mechanism, the data layer formed on an uppermost surface of the substrate and including a material responsive to at least one predetermined data access elimination factor, the data layer further characterized as eliminating recorded data in response to the at least one predetermined data access elimination factor; and a protective lacquer coating formed on an uppermost surface of the data layer.

2. A perishable media information storage mechanism as claimed in claim 1 wherein the substrate is formed of clear polycarbonate plastic.

3. A perishable media information storage mechanism as claimed in claim 1 wherein the data layer includes a decayable dye material.

4. A perishable media information storage mechanism as claimed in claim 3 wherein the decayable dye material includes at least one of Bis(p-dimethylaminophenyl)phenyl-4-methylaminomethylium chloride; Methyl Violet; CI Basic Violet 1 (4-NHMe) $C_{24}H_{28}N_3Cl(393.5)$, Bis(4-dimethylaminophenyl) streptopolymethinecyanine (n=2) $C_{21}H_{25}N_2Cl(340.5)$, 4-(4'-Dimethylaminostyryl)-2,6-diphenyltelluropyrylium tetrafluoroborate (n=1; tetrafluoroborate) $C_{27}H_{24}NBF_4Te(576.4)$, or Bis (chalcogenopyrylo) methine (n=1; X=S; Y=Se; Z=ClO$_4$) $C_{37}H_{27}O_4ClSSe(681.6)$.

5. A perishable media information storage mechanism as claimed in claim 4 wherein a thickness of the decayable dye material is in the range of 20 nm to 100 nm, with an optimal thickness of 50 nm.

6. A perishable media information storage mechanism as claimed in claim 4 wherein the decayable dye material includes decayable properties reactive in response to at least one of predetermined use factor and predetermined time factor.

7. A perishable media information storage mechanism as claimed in claim 1 wherein the data layer includes a liquid crystal memory cell including a liquid crystal material characterized as recording data therein, the liquid crystal material including properties responsive to an exerted bias for the elimination of access to data recorded therein based on a predetermined use factor.

8. A perishable media information storage mechanism as claimed in claim 1 wherein the data layer includes a photosensitive material responsive to an exerted light for the elimination of access to data recorded thereon the media information storage mechanism based on one of a predetermined use factor or a predetermined time factor.

9. A perishable media information storage mechanism as claimed in claim 1 wherein the data layer includes a plurality of magnetoresistive memory cells fabricated using MRAM technology.

10. A perishable media information storage mechanism as claimed in claim 9 wherein the magnetoresistive memory cells includes properties responsive to an exerted magnetic field for the elimination of access to data recorded therein based on a predetermined use factor.

11. A perishable media information storage mechanism comprising:

a substrate formed of an optical quality material;

a data layer including one of a decayable dye material, a liquid crystal material, a photosensitive material or a plurality of magnetoresistive memory cells for recording data thereon the media information storage mechanism, the data layer formed on an uppermost surface of the substrate and including a material responsive to at least one predetermined data access elimination factor, the data layer further characterized as eliminating recorded data in response to the at least one predetermined data access elimination factor;

a reflective layer formed on an uppermost surface of the data layer; and a protective lacquer coating formed on an uppermost surface of the reflective layer.

12. A perishable media information storage mechanism as claimed in claim 11 wherein the decayable dye material includes at least one of Bis(p-dimethylaminophenyl)phenyl-4-methylaminomethylium chloride; Methyl Violet; CI Basic Violet 1 (4-NHMe) $C_{24}H_{28}N_3Cl(3.93.5)$, Bis(4-dimethylaminophenyl) streptopolymethinecyanine (n=2) $C_{21}H_{25}N_2Cl(340.5)$, 4-(4'-Dimethylaminostyryl)-2,6-diphenyltelluropyrylium tetrafluoroborate (n=1; tetrafluoroborate) $C_{27}H_{24}NBF_4Te(576.4)$, or Bis (chalcogenopyrylo) methine (n=1; X=S; Y=Se; Z=ClO$_4$) $C_{37}H_{27}O_4ClSSe(681.6)$.

13. A perishable media information storage mechanism as claimed in claim 11 wherein the liquid crystal material includes properties responsive to an exerted bias for the elimination of access to data recorded therein based on a predetermined use factor.

14. A perishable media information storage mechanism as claimed in claim 11 wherein the magnetoresistive memory cells includes properties responsive to an exerted magnetic field for the elimination of data recorded therein based on a predetermined use factor.

15. A perishable media information storage mechanism as claimed in claim 11 wherein the photosensitive material includes properties responsive to an exerted light for the elimination of access to data recorded therein the data layer based on a predetermined use factor.

\* \* \* \* \*